United States Patent Office 3,385,910
Patented May 28, 1968

3,385,910
POLYMERIC LIGHT STABILIZERS AND
COMPOSITIONS THEREOF
Stanley Tocker, Wilmington, Del., assignor to E. I. du
Pont de Nemours and Company, Wilmington, Del., a
corporation of Delaware
No Drawing. Filed Apr. 15, 1964, Ser. No. 360,085
11 Claims. (Cl. 260—860)

ABSTRACT OF THE DISCLOSURE

Polymeric light stabilizers are provided having the following recurring group:

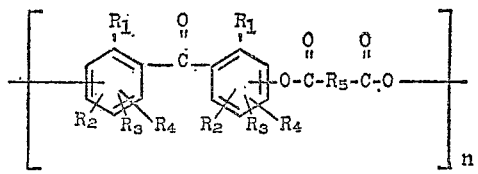

wherein $R_1$ is selected from the group consisting of hydrogen and hydroxyl with the proviso that at least one $R_1$ be hydroxyl;
$R_2$, $R_3$ and $R_4$ are selected from the group consisting of hydrogen, halogen, alkyl and alkoxy radicals;
$R_5$ is selected from the group consisting of arylene radicals and alkylene radicals of from 2 to 10 carbon atoms; and
$n$ is a positive integer of at least two.

This invention relates to organic polymers and to polymeric compositions containing the same and more particularly to light stabilizing polyesters for incorporation in polymeric shaped articles.

Many organic polymeric structures such as films of polyethylene, polypropylene, polyvinylidene chloride and the like deteriorate rapidly when subjected to sunlight. Degradation may take the form of discoloration, surface crazing, a decrease in elongation and flexibility which ultimately results in embrittlement, etc. Other polymeric materials such as polyvinyl fluoride, polyvinylidene fluoride, polytetrafluoroethylene and copolymers of tetrafluoroethylene with hexafluoropropylene, while not affected substantially by ultraviolet light themselves, do permit transmission of ultraviolet light to such an extent that they offer little protection to substrates when they are used as the outer layers of laminates and the like.

It is known to incorporate materials which exert a stabilizing effect against the degradation of ultraviolet light in such polymeric structures. In some cases, these materials are not retained effectively in the film structure with the result that the stabilizing or screening action against the transmission of ultraviolet light is lost. In other cases, stabilizing materials which are retained effectively have been employed but these tend to be rather expensive and add to cost of the polymeric film structures.

Accordingly, it is an object of the present invention to provide ultraviolet light absorbent polymers and polymeric compositions containing the same useful in preparing weather resistant organic polymeric shaped articles, particularly self-supporting films suitable for outdoor use.

It is a further object of this invention to provide ultraviolet light stabilizing systems which are highly effective over prolonged periods of time and which do not add prohibitively to the cost of manufacture of the polymeric shaped structures.

A still further object of this invention is to provide an ultraviolet light absorbent polymer which will not blush or exude from the surface of a polymeric shaped article. These and other objects will appear hereinafter.

These and other objects of the invention are accomplished by a polymer having the recurring group of the formula:

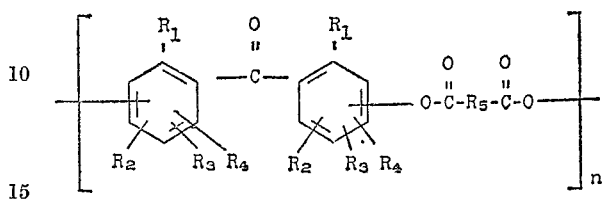

wherein $R_1$ is hydrogen or hydroxyl providing at least one $R_1$ be hydroxyl;
$R_2$, $R_3$ and $R_4$ are hydrogen, halogen, alkly or alkoxy radicals;
$R_5$ is an arylene radical or an alkylene radical of from 2 to 10 carbon atoms; and
$n$ is a positive integer of at least two, preferably 3 to 10.

The objects are further realized with polymeric compositions comprising such polymers in an essentially homogeneous mixture with a polymer derived from at least one ethylenically unsaturated monomer or a polyester.

The polyesters of this invention can be prepared easily by direct reaction of the dicarboxylic acid or acid chloride with the appropriate tri or tetra hydroxybenzophenone, usually in a suitable solvent such as benzene, xylene, nitrobenzene, cyclohexane and the like. The polyester can also be prepared by the transesterification of the appropriate benzophenone ester or by ester exchange of the tri or tetrahydroxybenzophenone with a lower alkyl ester of the dibasic acid.

Among the acid chlorides which are operable in forming the polyesters of the present invention are oxalyl, malonyl, succinyl, glutaryl, adipyl, pimelyl, suberyl, azelayl and sebacyl chlorides formed from the appropriate unsubstituted dicarboxylic acids. Dicarboxylic acid chlorides of longer carbon chain length can also be used, but such acid chlorides are relatively more difficult to obtain. Acid chlorides of aromatic dicarboxylic acids such as terephthalic acid, isophthalic acid, 5-methyl isophthalic acid, 2, 6-naphthalene dicarboxylic acid and p,p′-diphenylene dicarboxylic acid also are operable. Of these, the aliphatic dicarboxylic acid chlorides are preferred because of the more ready compatibility of the resulting polymeric stabilizer with various polymers, such as the polyolefins and haloolefin polymers. For stabilizing an aromatic polyester, a stabilizer made from an acid chloride of an aromatic discarboxylic acid can be used to advantage.

The essential feature of the benzophenone reactant is that it have at least one hydroxyl group ortho to the carbonyl group and that it have at least two other hydroxyl groups available for condensation with the acid dichloride. Operable benzophenones include 2,2′,4,4′-tetrahydroxybenzophenone, 2′4,4′-trihydroxybenzophenone, 2,2′4,4′-tetrahydroxy-3,5,5′-trimethylbenzophenone, 2,2′,4,4′-tetrahydroxy-3,5,5′ - trimethyoxybenzophenone, 2,2′,4,4′-tetrahydroxy-5,5′-dichlorobenzophenone.

In a preferred embodiment of this invention, an ultraviolet light stabilizing polyester is prepared from a benzophenone having a hydroxyl group ortho to the carbonyl such as 2,2′,4,4′-tetrahydroxybenzophenone with an acid chloride of a dicarboxylic aliphatic acid such as sebacyl chloride in a solvent such as nitrobenzene and refluxing the mixture until esterification is complete. The resulting polyester can be isolated by distilling off the solvent or it can be used in the nitrobenzene solvent and either incorporated in the desired polymer to be stabilized or it can be coated onto the surface of a given polymeric film, the solvent removed by distillation leaving a thin layer of the ultraviolet stabilizing polyester on the film surface. The preferred dibasic acid chlorides are those having 6–10 carbon atoms; the preferred orthohydroxybenzophenones are those having hydroxyl groups in the 4 and 4' positions.

The polyesters of the present invention are effective stabilizers for polymers derived from at least one ethylenically unsaturated monomer or for polyesters, particularly polyolefins, homopolymers and copolymers of vinylidene chloride and vinyl chloride and polyethylene terephthalate. The stabilizing polymers are effective when employed in amounts of from 0.1 to 10%, preferably 1 to 3% by weight of the total polymeric composition.

The invention is more fully illustrated in the description to follow.

Example 1

In a reaction flask fitted with a condenser fitted with a drying tube there is placed 22 grams (0.1 mol) of 2,2'4,4'-tetrahydroxybenzophenone, 24 grams of (0.1 mol) of sebacyl chloride and 150 ml. of nitrobenzene. The reaction mixture is heated at 143–146° C. for 8 hours while a slow stream of nitrogen is passed through the mixture. Nitrobenzene is removed under reduced pressure while holding the heating bath temperature at approximately 145° C., leaving the solid polyester product which shows strong absorption in the ultraviolet region of 3000–4000 A. The product shows a molecular weight of 1600 by boiling point elevation in benzene, which corresponds to approximately a tetramer.

Example 2

A 4-mil thick sheet of polyethylene film prepared in the conventional manner from polyethylene resin and treated to improve its adherability by the electrical discharge process described in U.S. Patent 3,018,189 is dipped in a 10% methyl ethyl ketone solution of the ultraviolet stabilizing polyester described in Example 1. The solvent is evaporated leaving a coating of the ultraviolet stabilizing polyester on the polyethylene film surface. When exposed to the action of a bank of Westinghouse FS–20–T–12 sunlamps the coated film shows no evidence of cracking after 2000 hours of such exposure. A control uncoated polyethylene film cracks when flexed after only 300 hours exposure.

A portion of the ultraviolet stabilizing polyester described in Example 1 is incorporated in isotactic polypropylene resin to the extent of 2 weight percent by milling on a rubber mill at 180° C. There is no tendency for the polymeric mixture to blush from or exude from the polypropylene resin. Samples are pressed into 4-mil thick films and these are placed in an Atlas Weather-Ometer. The samples show no tendency to crack upon flexing after 1000 hours exposure; in contrast, a control film containing no stabilizer shows evidence of cracking when flexed after only 300 hours exposure. Another control film containing initially 2.0 weight percent of 2-hydroxy-4-dodecyloxy-benzophenone, a conventional ultraviolet stabilizer, cracked on flexing after 600 hours of exposure. In the latter case, severe blushing of the stabilizer occurs; a white, hazy layer is observed at the surface of the film. A similar result is obtained with a control film containing initially 2.0 weight percent of a monomeric ester stabilizer, bis(3-hydroxy-4-benzophenyl) adipate.

Example 3

A polyester is prepared from 2,4,4'-trihydroxybenzophenone and adipyl chloride following the procedure described in Example 1. The nitrobenzene solvent is removed by heating under vacuum and the remaining polyester, corresponding to approximately a trimer, is incorporated in polyvinyl fluoride as follows. An organosol is prepared containing 2% by weight of the polyester described above in a mixture containing 40% of polyvinyl fluoride in N,N-dimethylacetamide, following the procedure described in U.S. Patent 2,953,818. The organosol is extruded through a slotted casting hopper maintained at approximately 50° C. into a water bath maintained at 15° C. The quenched film is heated to 150° C. for 15 minutes to evaporate the solvent, then it is biaxially oriented 2.5× in the machine and transverse directions at 90° C.

The polyvinyl fluoride film containing the stabilizing polymer is then used to form a laminar structure with a fiber glass-polyester formulation. A laminar structure made in this way shows no evidence of delamination nor any tendency toward a blushed appearance after exposure in an Atlas Weather-Ometer for 2000 hours (Atlas Sunshine Arc Weather-Ometer Model XW–R, wherein the sample is subjected to a complex environment which includes heat, ultraviolet light, visible light and moisture). In contrast, a similar laminate made with the polyvinyl fluoride film containing no stabilizer shows delamination at 1000 hours of exposure.

In another test, a newspaper is placed underneath the polyvinyl fluoride film containing the same stabilizer and the time to discolor the paper is noted. It is observed that the time required for the newspaper to discolor under the test film containing the stabilizer is four times that required when the polyvinyl fluoride does not contain a stabilizer, illustrating the effectiveness of the stabilizer for screening ultraviolet light.

Example 4

An ultraviolet stabilizing polyester is made from suberyl chloride and 2,2',4,4'-tetrahydroxybenzophenone following the procedure described in Example 1. The resulting product, from which the solvent has been removed by heating in a vacuum oven, is applied as a 10% solution in methyl ethyl ketone onto the surface of a 5-mil thick biaxially oriented and heat-set polyethylene terephthalate film. The film containing the stabilizer shows no degradation in physical properties when subjected to exposure for 2000 hours in an Atlas Weather-Ometer. A control film not containing the stabilizer shows an elongation value 50% lower than the test film under the same test conditions.

In another test, there is added 1% by weight of the polyester stabilizer to a solution of 17 parts by weight of 60/40 weight ratio ethylene terephthalate/ethylene sebacate copolyester in 83 parts by weight of carbon tetrachloride. A thin layer of this adhesive composition is brushed on one surface of each of two 3-mil thick sheets of polymeric linear terephthlate film. The solvent evaporated and the adhesive coated sheets are pressed together with a pressure of 500 p.s.i. at 90° C. for 5 minutes. The adhered laminate is then exposed to a bank of ultraviolet sunlamps for 500 hours. At the end of this time, the sheets are still firmly adhered; whereas a control laminate adhered with the same adhesive which does not have the added light stabilizer shows no adhesion with the same treatment.

What is claimed is:
1. A polymer having the recurring group of the formula:

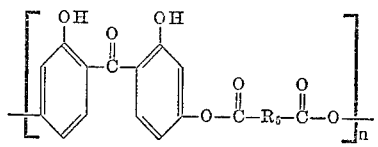

wherein $R_5$ is an alkylene radical of from 2 to 10 carbon atoms and $n$ is a positive integer of from 3 to 10 inclusive.

2. A light stable polymeric composition comprising a homogeneous mixture of an organic thermoplastic polymeric material and from 0.1 to 10% by weight, based upon the total weight of said composition of the polymer of claim 1.

3. A light stable polymeric composition comprising a homogeneous mixture of a polyolefin and from 0.1 to 10% by weight based upon the total weight of said composition of the polymer of claim 1.

4. A light stable polymeric composition comprising a homogeneous mixture of polyethylene terephthalate and from 0.1 to 10% by weight based upon the total weight of said composition of the polymer of claim 1.

5. A light stable polymeric composition comprising a homogeneous mixture of a haloolefin polymer and from 0.1 to 10% by weight based upon the total weight of said composition of the polymer of claim 1.

6. The composition of claim 4 in the form of a weather resistant self-supporting film structure.

7. A weather resistant film comprising: a base film structure of an organic thermoplastic polymeric material derived from at least one ethylenically unsaturated monomer having a coating on at least one surface thereof of the polymer of claim 1.

8. A weather resistant film comprising: a base film of a polyolefin and a coating on at least one surface of said base film of the polymer of claim 1.

9. The light stable polymeric composition of claim 2 wherein said organic thermoplastic polymeric material is a polyolefin.

10. The light stable polymeric composition of claim 9 wherein said polyolefin is polyethylene.

11. The light stable polymeric composition of claim 9 wherein said polyolefin is polypropylene.

References Cited

UNITED STATES PATENTS

| | | | |
|---|---|---|---|
| 2,943,076 | 6/1960 | Havens et al. | 260—45.85 |
| 2,983,708 | 5/1961 | Lappin | 260—45.85 |
| 3,173,893 | 3/1965 | Fertig et al. | 260—61 |
| 3,200,086 | 8/1965 | Coleman | 260—47 |
| 3,234,167 | 2/1966 | Sweeny | 260—61 |
| 3,265,760 | 8/1966 | Tucker | 260—862 |

MURRAY TILLMAN, *Primary Examiner.*

J. T. GOOLKASIAN, *Assistant Examiner.*

UNITED STATES PATENT OFFICE
CERTIFICATE OF CORRECTION

Patent No. 3,385,910                  May 28, 1968

Stanley Tocker

It is certified that error appears in the above identified patent and that said Letters Patent are hereby corrected as shown below:

Column 5, line 1, after "composition" insert a comma; line 5, after "weight", first occurrence, insert a comma; line 6, after "position" insert a comma; line 10, after "composition" insert a comma; line 14, after "composition" insert a comma; line 15, "4" should read -- 2 --.

Signed and sealed this 14th day of October 1969.

(SEAL)
Attest:

Edward M. Fletcher, Jr.
Attesting Officer

WILLIAM E. SCHUYLER, JR.
Commissioner of Patents